United States Patent
Jorgovanovic et al.

(10) Patent No.: US 10,630,421 B1
(45) Date of Patent: Apr. 21, 2020

(54) DYNAMIC SWITCHING OF DATA RATES

(71) Applicant: Amazon Technologies, Inc., Seattle, WA (US)

(72) Inventors: Milos Jorgovanovic, Mountain View, CA (US); Ganesha Batta, Pleasanton, CA (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/141,622

(22) Filed: Sep. 25, 2018

(51) Int. Cl.
| H04L 1/00 | (2006.01) |
| H04L 29/06 | (2006.01) |
| H04R 1/10 | (2006.01) |
| H04W 28/04 | (2009.01) |
| H04B 17/318 | (2015.01) |
| H04W 4/80 | (2018.01) |

(52) U.S. Cl.
CPC ......... *H04L 1/0002* (2013.01); *H04B 17/318* (2015.01); *H04L 1/0021* (2013.01); *H04L 65/4069* (2013.01); *H04R 1/1016* (2013.01); *H04W 28/04* (2013.01); *H04R 2201/109* (2013.01); *H04W 4/80* (2018.02)

(58) Field of Classification Search
CPC . H04L 1/0002; H04L 1/0021; H04L 65/4069; H04B 17/318; H04R 1/1016; H04R 2201/109; H04W 28/04; H04W 4/80
USPC .................................................. 370/241, 252
See application file for complete search history.

(56) References Cited

U.S. PATENT DOCUMENTS

| 2003/0100274 A1* | 5/2003 | Brown | ................ H04M 1/6066 455/90.1 |
| 2007/0173200 A1* | 7/2007 | Estrada | ................ H04B 7/0814 455/67.11 |
| 2019/0082371 A1* | 3/2019 | Burt | ...................... H04W 36/36 |

\* cited by examiner

*Primary Examiner* — Obaidul Huq
(74) *Attorney, Agent, or Firm* — Lee & Hayes, P.C.

(57) ABSTRACT

A wireless headphone that receives a device identifier of an electronic device communicatively coupled to the wireless headphone and determines that the electronic device supports dynamic rate switching between a first data rate and a second data rate. The wireless headphone receives data from the electronic device at the second data rate and determines a packet error rate (PER) value associated with receiving the data. The wireless headphone requests the electronic device to transmit data at the second data rate.

20 Claims, 6 Drawing Sheets

DYNAMIC SWITCHING OF DATA RATES

BACKGROUND

Mobile devices may include means for transmitting digital content for output on various types of loudspeakers, such as home speakers, in-ear headphones, and the like. For instance, a mobile device may transmit audio data associated with a song to one or more wireless headphones for output at the wireless headphones. In some instances, transmitting the audio data occurs at a single (or "basic") rate and irrespective of a proximity or a signal strength between the mobile device and the wireless headphones. In such instances, however, the basic rate may be unable to keep up with computing demands, potentially leading to poor user experience.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
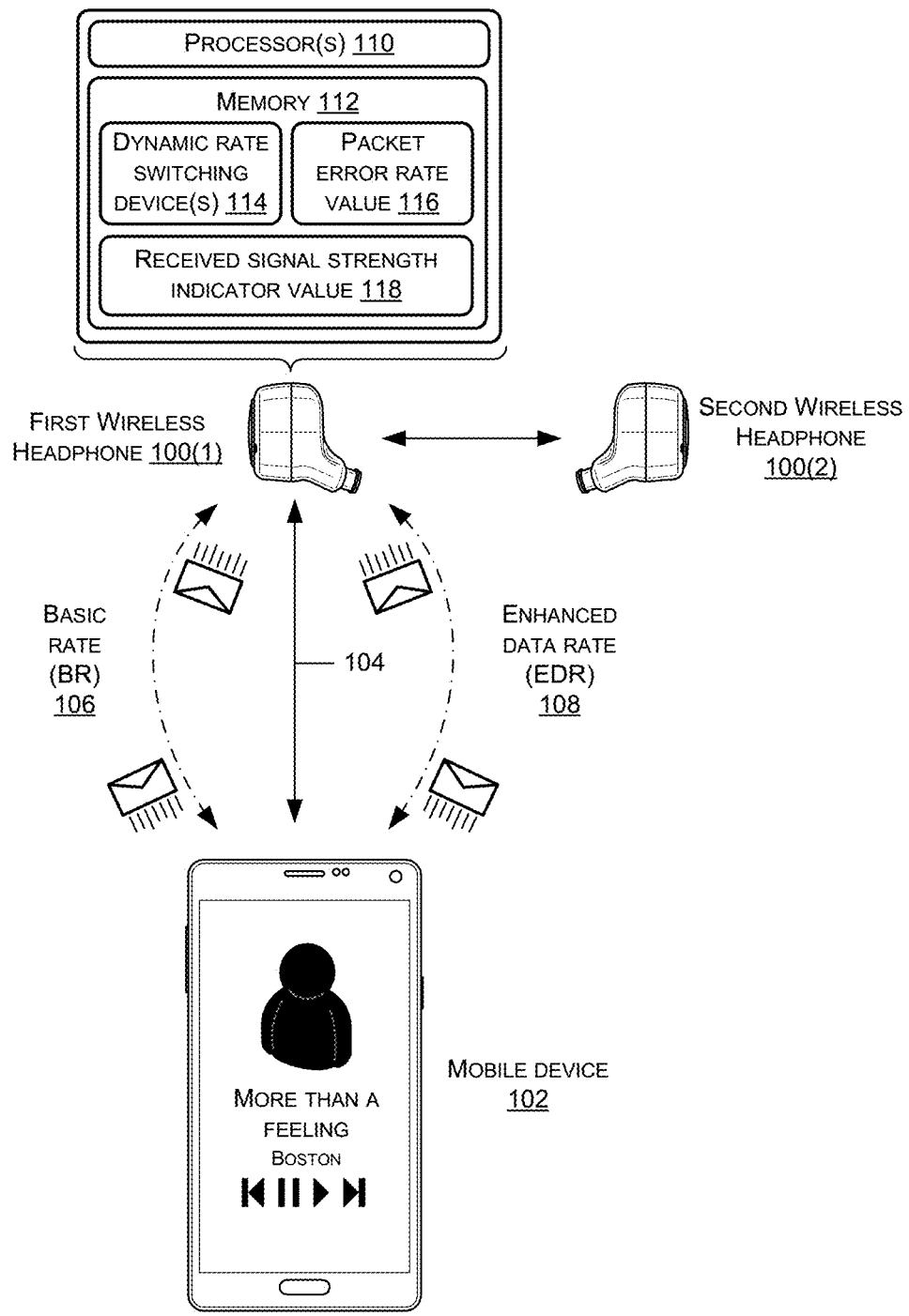
FIG. 1 illustrates an example environment showing a first wireless headphone in communication with a mobile device. The first wireless headphone may receive audio data over a communication channel from the mobile device. Additionally, in some instances, the mobile device may be configured to transmit the audio at a basic rate, or may be configured to dynamically switch between transmitting the audio data at the basic rate and an enhanced data rate. The first wireless headphone may also be in communication with a second wireless headphone to transmit or forward the audio data.

As discussed above, transmitting audio data from an electronic device to wireless headphones may occur at a basic rate. That is, regardless of a physical proximity of the electronic device to the wireless headphones or a signal strength between the wireless headphones and the electronic device, audio data is transmitted at the basic rate or an enhanced data rate. However, in some instances, it may be beneficial to switch between data transfer rates and/or transfer the audio data increased rates. For instance, as electronic devices evolve and users interact with electronic devices more and more, there becomes a need to increase and/or decrease the rate of transmitting data from an electronic device to wireless headphones.

Accordingly, this disclosure describes techniques for dynamic rate switching when transmitting audio data between an electronic device and wireless speakers, wireless earbuds, and/or other forms of wireless headphones (e.g., in-ear, over-ear, on-ear, etc.). One or more of the wireless headphones may be in communication with the electronic device, such as a mobile device (e.g., phone, tablet, laptop, etc.), and the wireless headphones may include multiple (e.g., two, three, etc.) wireless headphones that are synched, paired, or otherwise in communication with one another. In the examples described below, the techniques are discussed with reference to a pair of wireless headphones communicatively coupled to one another. In some instances, the pair of wireless headphones may include a primary wireless headphone and a secondary wireless headphone. The primary wireless headphone may communicatively couple to the electronic device to receive audio data and/or settings from the electronic device (e.g., volume, mute, pause, etc.), while also transmitting (e.g., forwarding) the audio data to the secondary wireless headphone.

The first wireless headphone may establish a connection with the electronic device to exchange information and/or receive audio data. For instance, the first wireless headphone may conduct an out of box experience (OOBE) with the electronic device. In some instances, the wireless headphone that is currently wirelessly coupled to the mobile device may be designated as the primary headphone, while the other headphone that receives the audio data from the primary headphone may be designated as the secondary headphone. Through establishing the connection, or in the process of establishing the connection, the first wireless headphone may receive one or more identifier(s) of the electronic device (e.g., make, model, chipset, characteristics, etc.).

In receiving the audio data, the first wireless headphone may determine whether the electronic device is configured for dynamic rate switching, supports dynamic rate switching, or is otherwise capable of performing dynamic rate switching. As used herein, dynamic rate switching may refer to the ability of the electronic device to transfer, send, or otherwise transmit audio data to the first wireless headphone at varying or dynamic rates over a wireless communication channel(s) (e.g., Bluetooth, ZigBee, Z-wave, Bluetooth low energy (BLE), Wi-Fi, AFT, or the like). By way of example, electronic devices may be configured to transmit audio data to the first wireless headphone over a Bluetooth communication channel at a basic rate (BR) and/or at an enhanced data rate (EDR). In some instances, the BR may transmit audio data up to or at approximately 1 Mbps while the EDR may transmit audio data up to or at approximately 2 Mbps or 3 Mbps.

Determining whether the electronic device is configured for dynamic rate switching may involve a comparison of the device identifier(s) to identifier(s) stored in a database. For instance, a database may store a list of electronic-device identifier(s) associated with electronic devices that are configured for dynamic rate switching or alternatively, a list of electronic-device identifier(s) associated with electronic devices that are not configured for dynamic rate switching. In some instances, the database may be stored at the first wireless headphone, the electronic device, and/or one or more remote computing resource(s) communicatively coupled to the first wireless headphone and/or the electronic device. Through a comparison of the identifier(s), the first wireless headphone may determine whether the electronic device is configured for dynamic rate switching. Alternatively, in instances where the database is stored remotely from the headphone (e.g., on the mobile device, a remote server, etc.), the first wireless headphone may receive an indication whether the electronic device is configured for dynamic rate switching.

Initially, the first wireless headphone may receive the audio data at the EDR. In instances where the electronic device is not capable of dynamic rate switching, the electronic device may only transmit the audio data at the EDR (or the second data rate). Comparatively, if the electronic device is configured for or supports dynamic rate switching, the first wireless headphone may begin monitoring conditions associated with a connection between the first wireless headphone and the electronic device, such as a physical proximity of the electronic device and the first wireless headphone, a signal strength between the electronic device and the first wireless headphone, an error rate associated with transmitting audio packets (e.g., advanced audio distribution profile packets (A2DP) packets), an environmental RSSI associated with an environment in which the wireless headphones reside, and/or the like. For instance, switch between transmitting the audio data at the EDR and the BR may be based on a received signal strength indicator (RSSI) between the first wireless headphone and the electronic device and/or a packet error rate (PER) associated with the communication between the mobile device and the wireless headphone. The PER value may represent a percentage of packets not successfully received by or at the first wireless headphone (e.g., 10%, 20%, 30%, and so forth) or may represent a value of packets not successfully received by or at the first wireless headphone.

In some instances, the PER value and/or the RSSI value may be compared to thresholds. For instance, if the PER value is greater than a PER threshold and/or if the RSSI value is less than a RSSI threshold, the audio data may be transmitted at the BR. In other words, when the PER value is greater than a threshold and/or the signal strength between the electronic device and the first wireless headphone is insufficient, audio data may be transmitted at the BR. In some instances, the first wireless headphone may average the PER value and/or the RSSI value over a period of time or over a predetermined amount of previously received packets (e.g., last 10, 20, 30, etc.) to determine whether the PER value is greater than the PER threshold. Additionally, the first wireless headphone may average the RSSI value over a period of time or over a predetermined amount of previously received packets (e.g., last 10, 20, 30, etc.) to determine whether the RSSI value is less than the RSSI threshold.

In some instances, the PER threshold and/or the RSSI threshold may correspond to thresholds at which the EDR can or cannot be supported. For instance, continuing to transmit audio data when the PER values are above the PER threshold and/or when the RSSI values are below the RSSI threshold may result in buffering of the audio data.

Noted above, the electronic device initially transmits the audio data at the EDR until the one or more of the conditions are met. That is, the electronic device may transmit the audio data at the EDR until the PER value is greater than the PER threshold and/or the RSSI value is less than the RSSI threshold. In instances where the PER value is greater than the PER threshold and/or the RSSI value is less than the RSSI threshold, the first wireless headphone may transmit an indication (e.g., control packet) to the electronic device to switch from transmitting audio data at the EDR to the BR.

In some instances, transmitting the audio data at the EDR may comprise transmitting first audio data corresponding to audio to be outputted by the wireless headphones. For instance, at the EDR, the first audio data may represent a first portion of a song to be output by the wireless headphones. In switching to the BR, second audio data may be transmitted to the wireless headphones, where the second audio data represents a second portion of the song to be output by the wireless headphones (e.g., a remaining portion of the song not transmitted at the EDR).

After switching to the BR, the first wireless headphone may determine the PER value and/or the RSSI value between the electronic device and the first wireless headphone. In some instances, switching from the EDR to the BR (and vice versa) may reset or zero the average PER value and/or the average RSSI value. For instance, a time or counter associated with the determining the PER and/or the RSSI may be reset. Noted above, these averages may be utilized to determine whether the PER value is less than the PER threshold and/or whether the RSSI value is greater than the RSSI threshold. That is, if the PER value is greater than the PER threshold and/or RSSI value is less than the RSSI threshold, the first wireless headphone may continue transmitting the audio data at the BR. In some instances, the PER threshold and/or the RSSI threshold when switching from the BR to the EDR may be different or similar than the PER threshold and/or the RSSI threshold when switching from the EDR to the BR rate. However, the first wireless headphone may continue determining whether the PER value is less than the PER threshold and/or whether the RSSI value is greater than the RSSI threshold for the purpose of switching from the BR to the EDR. Therefore, when the PER value is less than the PER threshold and/or the RSSI value is greater than the RSSI threshold, the first wireless headphone may transmit an indication (e.g., control packet) to the electronic device that instructs the electronic device to switch from transmitting audio data at the BR to the EDR. The electronic device, may in some instances, transmit an acknowledgment back to the first wireless headphone indicating a receipt of the indication. Upon switching to the EDR, the first wireless headphone may repeat the process discussed hereinabove and determine whether the PER value is greater than the PER threshold and/or whether the RSSI value is less than the RSSI threshold. If so, the first wireless headphone may transmit the indication instructing the electronic device to switch from the EDR to the BR. Otherwise, the electronic device may continue transmitting the audio data at the EDR.

As a result of the techniques discussed above, electronic devices may dynamically switch the rate at which the audio data is transmitted to the wireless headphones. Such techniques may prove useful given the number of applications that employ Bluetooth or other communication protocols, for instance. That is, as numerous applications may utilize Bluetooth, or other communication protocol, to transmit audio data and/or other types of data, there may be a need to increase the rate of transmitting the data. Thus, in some instances, electronic devices may increase or decrease the rate of transmitting the audio data to prevent cutting out, buffering, skipping, or other adverse effects. In other words, in instances where the electronic device is not configured for dynamic rate switching, continuing to transmit the audio data at the increased rate may result in a song buffering. However, switching from the increased rate to a decreased rate may potentially eliminate such buffering.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a first wireless headphone 100(1) and a second wireless headphone 100(2). The first wireless headphone 100(1) and the second wireless headphone 100(2) may collectively be referred to herein as "the wireless headphones 100." In some instances, the first wireless headphone 100(1) and the second wireless headphone 100(2) may be physically similar and look alike, while in other instances, one of the wireless headphones 100 may be designed for and designated as a right headphone while the other may be designed for and designated as a left headphone. Additionally, in some instances, the wireless headphones 100 may resemble earbud headphones that fit within the ear and/or ear canal of a user, while in other instances, the wireless headphones 100 may reside atop the ear or over the ear of the user.

The first wireless headphone 100(1) may communicatively couple to a mobile device 102 and/or the second wireless headphone 100(2) using one or more communication channel(s), such as Bluetooth (e.g., 802.11), Bluetooth Low Energy (BLE), ZigBee (e.g., 802.15.4), Z-wave, near-field magnetic induction (NFMI), or the like. For instance, FIG. 1 illustrates that the first wireless headphone 100(1) communicatively couples to the mobile device 102 over a communication channel 104. FIG. 1 also illustrates that the second wireless headphone 100(2) is not communicatively coupled to the mobile device 102, but is instead communicatively coupled to the first wireless headphone 100(1). Here, the first wireless headphone 100(1) may transmit (e.g., forward) data transferred over the communication channel 104 to the second wireless headphone 100(2).

The first wireless headphone 100(1) may receive audio data from the mobile device 102, such as audio data associated with a song, phone call, podcast, and the like, over the communication channel 104. In some instances, the first wireless headphone 100(1) may receive additional or other data over the communication channel 104, such as data associated with setting(s) of the wireless headphones 100 (e.g., volume, pause, answer call, power on, etc.). The first wireless headphone 100(1) may have one or more speaker(s) for outputting the audio data. The first wireless headphone 100(1) may also transmit the audio data to the second wireless headphone 100(2) for output at one or more speaker(s).

In some instances, the mobile device 102 may be configured to transmit the audio data over the communication channel 104 at various rates. For instance, newer versions of Bluetooth, such as Bluetooth 2, Bluetooth 2.1, Bluetooth 4.0, and Bluetooth 4.1 are capable of transmitting data 2 or 3 times faster than previous versions. The newer versions of Bluetooth transfer data an enhanced data rate (EDR) up to approximately 2 Mbps or 3 Mbps, compared to Bluetooth 1.2, which transfers data up to approximately 1 Mbps. These increased rates are particularly useful in the computing industry given that devices may run several Bluetooth links concurrently (e.g., streaming audio, gaming, home security, hands-free calling, etc.). Running concurrently links, however, often requires increased data rates or an increased capacity to avoid adverse effects such as chopping, skipping, buffering, and cutting out. However, not all devices, such as the mobile device 102, may support the newer versions of Bluetooth. Additionally, in some instances, some devices may be capable of transmitting data under both older and newer versions of Bluetooth, or between first and second data rates. For instance, shown in FIG. 1, the mobile device 102 may transfer audio data over the communication channel 104 at a basic rate (BR) 106, which may correspond to Bluetooth 1.2, or at the EDR 108, which may correspond to any of Bluetooth 2, Bluetooth 2.1, Bluetooth 4.0, and Bluetooth 4.1.

In some instances, devices, such as the mobile device 102, may be configured to dynamically switch between transmitting data under older and newer versions of Bluetooth or BLE. For instance, transferring data at the EDR 108 may demand a short range between transferring devices, such as the mobile device 102 and the first wireless headphone 100(1), where the signal strength is high and the link quality (e.g., Signal-to-Noise) is high. However, as a user interacts with the mobile device 102, the range between the mobile device 102 and the first wireless headphone 100(1) may increase or decrease, resulting in the signal strength decreasing and increasing, respectively. For instance, the user may move the mobile device 102 between his or her pocket and reading content on the mobile device 102 in close proximity to his or her face. In these instances where the signal strength is low, for instance, transferring data at the EDR 108 may not be appropriate or supported. That is, the connection may not support transmitting the audio data at the EDR 108. In such instances, rather than canceling the communication channel 104 between the mobile device 102 and the first wireless headphone 100(1), or continuing to transmit the audio data at the EDR 108, which may result in buffering, the mobile device 102 may dynamically switch to transferring data under older Bluetooth versions, such as Bluetooth 1.2. Not all devices, however, may be capable of dynamic switching between data transfer rates. For instance, whether the mobile device 102 is configured for dynamic rate switching may depend on characteristics of the mobile device 102, such as a make, model, chipset, or other hardware characteristics.

Initially, regardless of whether the mobile device 102 is configured for dynamic rate switching, the mobile device 102 may begin transmitting the audio data at the EDR 108. However, after receiving the audio data at the EDR 108, the mobile device 102 may determine whether the mobile device 102 is configured for dynamic rate switching using one or more device identifier(s) of the mobile device 102. In some instances, the one or more device identifier(s) may be transmitted over the communication channel 104 to the first wireless headphone 100(1). In some instances, the one or more device identifier(s) may be transmitted in response to the first wireless headphone 100(1) transmitting a request to the mobile device 102. The first wireless headphone 100(1) may utilize the one or more device identifier(s) to determine whether the mobile device 102 is configured for dynamic rate switching. For instance, the first wireless headphone 100(1) may compare the one or more device identifier(s) with device identifier(s) that are configured for dynamic rate switching. In some instances, the one or more device identifier(s) may be compared to a database or a list of device identifier(s) configured for dynamic rate switching. The list of device identifier(s) may be stored at the first wireless headphone 100(1) and/or the mobile device 102.

For instance, FIG. 1 illustrates that the first wireless headphone 100(1) may include a processor(s) 110 and memory 112 storing a list of dynamic rate switching device(s) 114. The first wireless headphone 100(1) may compare the one or more device identifier(s) with the list of dynamic rate switching device(s) 114. If the one or more device identifier(s) are included within the list of dynamic rate switching device(s) 114, the first wireless headphone 100(1) may determine that the mobile device 102 is configured for dynamic rate switching. In some instances, depending on the comparison, the first wireless headphone 100(1) may transmit an indication to the mobile device 102, which indicates whether the mobile device 102 is to transmit the audio data at the BR 106, or to transmit the audio data at the BR 106 and the EDR 108 (e.g., between the BR 106 and the EDR 108). In some instance, the mobile device 102 may store the indication for use when communicating with the first wireless headphone 100(1). In other words, the indication may serve notify the mobile device 102 whether the mobile device 102 is configured to transmit the audio data at the BR 106 and/or the EDR 108.

The mobile device 102 may continue transmitting the audio data at the EDR 108 until one or more conditions are met. In some instances, the first wireless headphone 100(1) may begin determining the one or more conditions in response to determining that the mobile device 102 is configured for dynamic rate switching. For instance, if the mobile device 102 is configured for dynamic rate switching, the first wireless headphone 100(1) may begin determining whether a signal strength between the mobile device 102 and the first wireless headphone 100(1) is low, or if a packet error rate (PER) value is high. In this sense, these determinations may be utilized by the first wireless headphone 100(1) when requesting the mobile device 102 to dynamically switch between the EDR 108 and the BR 106.

To illustrate, the memory 112 of the first wireless headphone 100(1) is shown storing a packet error rate (PER) value 116 and a received signal strength indicator (RSSI) value 118. In instances where the mobile device 102 is configured for dynamic rate switching, the first wireless headphone 100(1) may determine, during the course of receiving the audio data at the EDR 108, the PER value 116 and the RSSI value 118. The PER value 116 may represent audio data packets sent by the mobile device 102 but not successfully received by the first wireless headphone 100(1). The RSSI value 118 may represent a signal strength between the mobile device 102 and the first wireless headphone 100(1). For instance, while receiving the audio data, the processor(s) 110 may determine, collect, and/or store in the memory 112, data associated with the PER value 116 and/or the RSSI value 118. In some instances, the PER value 116 may represent an average PER value and/or the RSSI value 118 may represent an average RSSI value determined over a predetermined amount of time or over a predetermined amount of previously received packets (e.g., last 10, 20, 30, etc.).

In some instances, the first wireless headphone 100(1) may compare the PER value 116 with a PER threshold and/or the RSSI value 118 with a RSSI threshold for the purpose of dynamically switching between the EDR 108 and the BR 106. For instance, if the first wireless headphone 100(1) determines that the PER value 116 is greater than the PER threshold and/or the RSSI value 118 is less than the RSSI threshold, the first wireless headphone 100(1) may transmit a request (e.g., indication) to the mobile device 102 to transmit the audio data at the BR 106. In other words, if the PER value is high and/or the RSSI value is low, the mobile device 102 may not be able to support transmitting (e.g., buffering) the audio data at the EDR 108 and may dynamically switch between from the EDR 108 to the BR 106.

Additionally, when the audio data is transmitted at the BR 106, the first wireless headphone 100(1) may compare the PER value 116 with the PER threshold and/or the RSSI value 118 with the RSSI threshold. Here, if the PER value 116 is less than the PER threshold and/or the RSSI value 118 is greater than the RSSI threshold, the first wireless headphone 100(1) may transmit an indication (e.g., control packet) to the mobile device 102 to transmit the audio data at the EDR 108. Therein, at the EDR 108, the first wireless headphone 100(1) may routinely, or continuously determine the PER value 116 and/or the RSSI value 118 for purposes of determining whether to switch from the EDR 108 to the BR 106. In some instances, after switching between the BR 106 and the EDR 108 (vice versa), the PER value 116 and/or the RSSI value 118 (or averages thereof) may be reset in order to calculate new running values. For instance, a time or counter associated with the determining the PER value 116 and/or the RSSI value 118 may be reset. Further, in some instances, after switching between the EDR 108 and the BR 106 (vice versa), a threshold amount of time may elapse before requesting the mobile device 102 to switch to the BR 106 or the EDR 108, respectively.

The first wireless headphone 100(1) may receive a first portion of the audio data via the BR 106 or the EDR 108, and therein, after requesting the mobile device 102 to switch to either the EDR 108 or BR 106, may receive a second portion of the audio data via another of the EDR 108 or the BR 106. For instance, the first wireless headphone 100(1) may receive a first portion of a song to be output by the wireless headphones 100 at the EDR 108. Based at least in part on determining that the PER value 116 is greater than the PER threshold and/or the RSSI value 118 is not greater than the RSSI threshold, for instance, the first wireless headphone 100(1) may receive a second portion of the audio data at the BR 106. Here, the second portion of the audio data may represent a remaining portion of the song that was not transmitted to and received by the first wireless headphone 100(1) at the EDR 108.

As noted above, in some instances, as the first wireless headphone 100(1) and the second wireless headphone 100(2) may be nearly indistinguishable, the user may conduct an out-of-box experience (OOBE) with the wireless headphones 100 to associate the mobile device 102 with the wireless headphones 100. The OOBE may also configure one of the wireless headphones 100 as the first wireless headphone 100(1) and another of the wireless headphones 100 as the second wireless headphone 100(2). Additionally, the OOBE may configure the first wireless headphone 100(1) to establish communication with the mobile device 102 and/or obtain the one or more identifier(s) of the mobile device 102 in order to determine whether the mobile device 102 is configured for dynamic rate switching. In some instances, the first wireless headphone 100(1) may be considered a primary wireless headphone as it receives the audio data and the one or more identifier(s) from the mobile device 102, while the second wireless headphone 100(2) may be considered a secondary wireless headphone.

Figure 2:
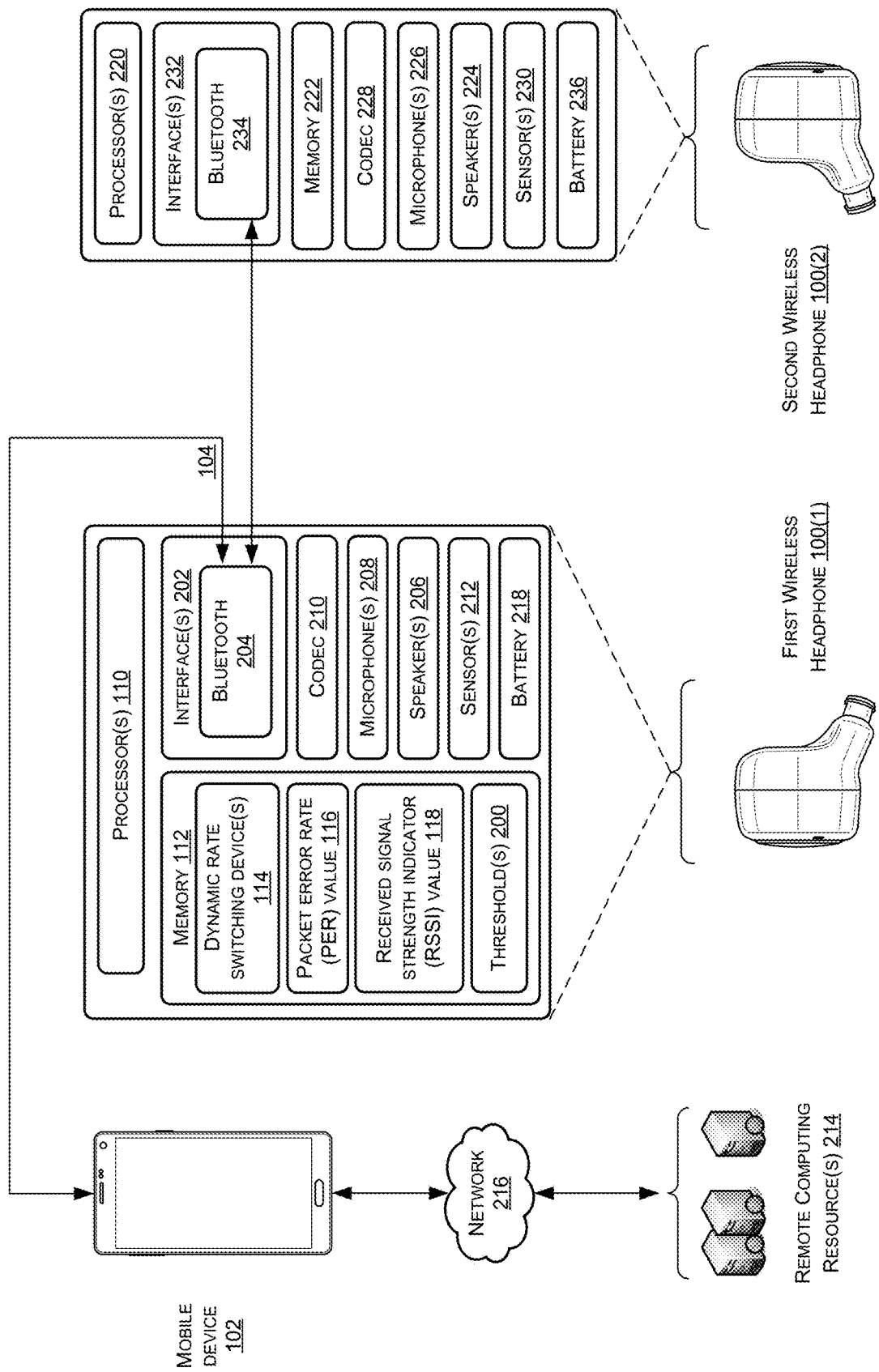
FIG. 2 illustrates a functional block diagram of example wireless headphones, as well as communication channels between the wireless headphones, a mobile device, and/or one or more remote computing resource(s).

FIG. 2 illustrates selected functional components of the first wireless headphone 100(1) and the second wireless headphone 100(2). The first wireless headphone 100(1) may include the processor(s) 110 and the memory 112, which stores or otherwise has access to a list of dynamic rate switching device(s) 114, the packet error rate (PER) value 116, and the received signal strength indicator (RSSI) value 118.

As discussed above in FIG. 1, the list of dynamic rate switching device(s) 114 may represent a list of devices capable of, or configured for, dynamic rate switching between the BR 106 and the EDR 108. The processor(s) 110 may compare the one or more device identifier(s) with the list of dynamic rate switching device(s) 114 to determine whether the mobile device 102 is configured for dynamic rate switching. The PER value 116 may correspond to a PER of audio data transmitted from the mobile device 102 to the first wireless headphone 100(1). The PER value 116 may be determined by the processor(s) 110 and utilizing the audio data. In some instances, the PER value 116 may represent a ratio between a number of transmitted audio packets and a number of received audio packets. In some instances, the PER value 116 may correspond to an average PER value over a predetermined amount of time. For instance, switching between the BR 106 and the EDR 108 may cause the average PER value to reset (e.g., time or count based). Additionally, the RSSI value 118 may represent a signal strength between the mobile device 102 and the first wireless headphone 100(1). The RSSI value 118 may be determined and/or collected by the processor(s) 110. In some instances, the RSSI value 118 may correspond to an average RSSI value over a predetermined amount of time and switching between the BR 106 and the EDR 108 may cause the average RSSI value to reset.

FIG. 2 also illustrates that the memory 112 may store or have access to one or more threshold(s) 200. The one or more threshold(s) 200 may include a PER threshold and/or a RSSI threshold utilized for comparison with the PER value 116 and the RSSI value 118, respectively. The threshold(s) 200 may also include an environment RSSI threshold. In some instances, the threshold(s) 200 may be based at least in part on characteristic(s) of the mobile device 102 or may be unique to the mobile device 102. For instance, using the one or more device identifier(s) received from the mobile device 102, the first wireless headphone 100(1) may determine a corresponding PER threshold and/or a corresponding RSSI threshold. The processor(s) 110 may be configured to compare the PER value 116 with the PER threshold and/or the RSSI value 118 with the RSSI threshold for determining whether to switch from the BR 106 to the EDR 108, and vice versa. For instance, if the PER value 116 is less than the PER threshold and/or the RSSI value 118 is greater than the RSSI threshold, the first wireless headphone 100(1) may transmit an indication to the mobile device 102 to transmit audio data at the EDR 108. The mobile device 102, may in some instances, transmit an acknowledgment back to the first wireless headphone 100(1) indicating a receipt of the indication.

In some instances, the PER threshold and/or RSSI threshold associated with switching from the BR 106 to the EDR 108 may be different than the PER threshold and/or the RSSI threshold associated with switching from the EDR 108 to the BR 106, respectively. For instance, the PER threshold when switching from the BR 106 to the EDR 108 may be greater than the PER threshold when switching from the EDR 108 to the BR. Alternatively, or additionally, the RSSI threshold when switching from the BR 106 to the EDR 108 may be different than the RSSI threshold when switching from the EDR 108 to the BR 106. For instance, the RSSI threshold when switching from the BR 106 to the EDR 108 may be greater than the RSSI threshold when switching from the EDR 108 to the BR 106.

FIG. 2 illustrates that the first wireless headphone 100(1) includes one or more interface(s) 202, such as a Bluetooth interface 204, to communicate and/or receive audio data from the mobile device 102 (e.g., via the communication channel 104). The one or more interface(s) 202 may also be used to communicate, transmit audio data (or other data), or receive data to/from the second wireless headphone 100(2). In some instances, the first wireless headphone 100(1) may communicate with the second wireless headphone 100(2) using one or more separate communication channels. For instance, the first wireless headphone 100(1) may transmit audio data settings and/or commands (e.g., volume up, answer phone call, etc.) over a first communication channel (e.g., Bluetooth, BLE, etc.), and may transmit audio data over a second communication channel (e.g., NFMI).

The first wireless headphone 100(1) may include one or more speakers(s) 206 to output audio associated with the audio data. Additionally, the first wireless headphone 100(1) may include one or more microphone(s) 208 to detect input from a user. For instance, the one or more microphone(s) 208 may receive audio input, such as sound uttered by the user, to perform certain actions at the wireless headphones 100 or settings associated with the wireless headphones 100 (e.g., skip song, answer phone call, and the like). A codec 210 is coupled to the one or more microphone(s) 208 to encode the audio signals. The codec 210 may also convert audio data between analog and digital formats. For instance, the user may interact with the first wireless headphone 100(1) by speaking and the one or more microphone(s) 208 may capture the user speech. Therein, the codec 210 encodes the user speech and transfers the audio data to other components. The codec 210 is also coupled to the one or more speaker(s) 206 to decode the audio signals.

Additionally, in some instances, the first wireless headphone 100(1) may include sensor(s) 212, such as accelerometers, capacitive touch sensors, buttons, motion sensors, and so forth, capable of receiving and/or detecting input from the user. For example, to increase the volume of the audio output by the one or more speaker(s) 206, the user may tap (e.g., touch) the first wireless headphone 100(1). The sensor(s) 212 may detect this touch, whether by an accelerometer or by capacitive touch sensor, and the processor(s) 110 may determine a command associated with the touch (e.g., increasing the volume, answering a phone call, etc.). Instituting the command may cause certain actions to be performed or configure the wireless headphones 100 to certain setting(s).

In some instances, the first wireless headphone 100(1) may operate in conjunction with remote computing resource(s) 214 that are remote from the wireless headphones 100. For instance, the first wireless headphone 100(1) may communicatively couple to the remote computing resource(s) 214 over a network 216 and via the mobile device 102. For instance, the mobile device 102 may serve as an interface between the remote computing resource(s) 214 and the wireless headphones 100.

The mobile device 102 may communicatively couple to the network 216 using wireless technologies (e.g., RF, cellular, satellite, Bluetooth, etc.), or other connection technologies. In this sense, the mobile device 102 may communicatively couple the first wireless headphone 100(1) to the remote computing resource(s) 214. However, in some instances, the first wireless headphone 100(1), may communicatively couple to the remote computing resource(s) 214 without utilizing the mobile device 102. For instance, the one or more interface(s) 202 may additionally, or alternatively, include a cellular, RF, or satellite interface to couple to the remote computing resource(s) 214.

The remote computing resource(s) 214 may be implemented as one or more servers and may, in some instances, form a portion of a network-accessible computing service implemented as a computing infrastructure of processors, storage, software, data access, and so forth that is maintained and accessible via a network such as the Internet. Common expressions associated for these remote computing resource(s) 214 include "on-demand computing", "software as a service (SaaS)", "cloud services", "data centers", and so forth.

The remote computing resource(s) 214 may include processor(s) and memory that perform various functions or operations. For instance, the remote computing resource(s) 214 may stream audio data to the first wireless headphone 100(1) (e.g., via the mobile device 102). The remote computing resource(s) 214 may also transmit software updates and/or updates to the list of dynamic rate switching device(s) 114 to the first wireless headphone 100(1). For instance, from time to time, the devices capable of dynamic rate switching may change and/or the thresholds associated with the PER threshold and/or the RSSI threshold may change. These change, or update, may prompt an update to the list of dynamic rate switching device(s) 114 and/or the threshold(s) 200, respectively. As such, for instance, the remote computing resource(s) 214 may be configured to push an update to the list of dynamic rate switching device(s) 114 stored at the first wireless headphone 100(1).

However, in some instances, the remote computing resource(s) 214 may additionally, or alternatively, store the list of dynamic rate switching device(s) 114 and/or the threshold(s) 200. In such instances, the first wireless headphone 100(1) may transmit the one or more device identifier(s) to the remote computing resource(s) 214, where the remote computing resource(s) 214 determines whether the mobile device 102 is configured for dynamic rate switching. Similarly, the remote computing resource(s) 214 may transmit indications of the threshold(s) 200 when stored remotely.

The remote computing resource(s) 214 may also train the threshold(s) 200, such as the PER threshold and/or the RSSI threshold utilizing data collected by the first wireless headphone 100(1). Training the threshold(s) 200 may allow for a more effective determination of when to transition between the BR 106 and the EDR 108. For instance, the threshold(s) 200 may correspond to when buffering of the audio data occurs. In such instances, given that the remote computing resource(s) 214 may have a computational capacity that far exceeds the computational capacity of the first wireless headphone 100(1), the first wireless headphone 100(1) may utilize the remote computing resource(s) 214 for performing relatively complex analysis.

Additionally, given that the user may utter commands that are captured by the one or more microphone(s) 208, in some instances, the first wireless headphone 100(1) may transmit the audio data to the remote computing resource(s) 214, which may analyze the speech, perform certain actions, generate a response, and transmit the response to the wireless headphones 100 for output. Regardless, the commands may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

A battery 218 is further provided to distribute power to the various components of the first wireless headphone 100(1).

The second wireless headphone 100(2) may include similar components as the first wireless headphone 100(1), such as processor(s) 220, memory 222, one or more speaker(s) 224, one or more microphone(s) 226, a codec 228, sensor(s) 230, and one or more interface(s) 232, including a Bluetooth interface 234. In some instances, the second wireless headphone 100(2) may also include a NFMI interface to receive audio data from the first wireless headphone 100(1) and/or a BLE interface to receive audio data settings. The second wireless headphone 102(2) may also include a battery 236. Shown in FIG. 2, the memory 222 of second wireless headphone 100(2) may not store or otherwise have access to the list of dynamic rate switching device(s) 114, the PER value 116, the threshold(s) 200, and so forth. However, in some instances, the second wireless headphone 100(2) may additionally or alternatively store similar or identical content as the memory 112 of the first wireless headphone 100(1). For instance, the second wireless headphone 100(2) may be configured to include the list of dynamic rate switching device(s) 114, the threshold(s) 220, and so forth, in addition to or in lieu of the memory 112 of the first wireless headphone 100(1). Additionally, in some instances, the second wireless headphone 100(2) may perform similar or identical functions as the first wireless headphone 100(1), such as detecting user speech and/or determining the PER value 116 associated with the audio data, and may be configured to communicatively couple to the remote computing resource(s) 214, whether indirectly (e.g., via the mobile device 102 and/or the first wireless headphone 100(1)) or directly (e.g., via the network 216). In other words, depending on the OOBE, the second wireless headphone 100(2) may be configured as the primary headphone.

Further, in some instances, processor(s) 110, 220 of the wireless headphones 100 may be configured to account for a latency in transmission between the first wireless headphone 100(1) and the second wireless headphone 100(2). That is, as the first wireless headphone 100(1) receives the audio data before the second wireless headphone 100(2) receives the audio data 108, there may be a lag in sound outputted between the wireless headphones 100. The first wireless headphone 100(1), however, may account for this latency and delay output of the audio data at the first wireless headphone 100(1) such that audio outputted by both wireless headphones 100 is consistent.

A battery 236 is further provided to distribute power to the various components of the second wireless headphone 100(2).

As used herein, a processor, such as processor(s) 110, 220 and/or the processor(s) of the remote computing resource(s) 214 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 112, 222, and/or the memory of the remote computing resource(s) 214 may include volatile and non-volatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 3-6 illustrate various processes related to dynamic rate switching between wireless headphones and a mobile device. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems.

Figure 3:
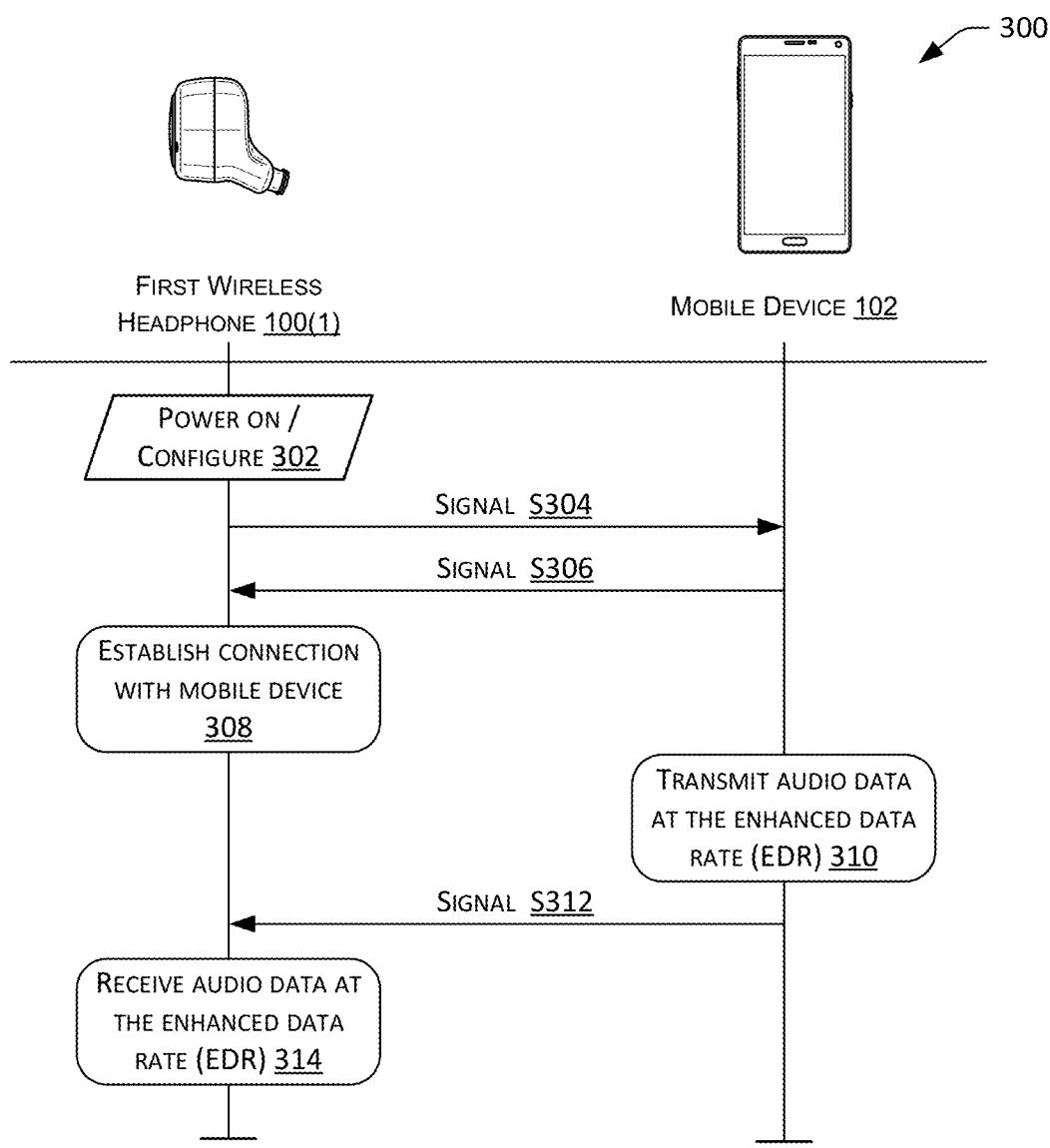
FIG. 3 illustrates an example signal diagram for establishing a connection between a mobile device and a wireless headphone.

FIG. 3 illustrates a signal diagram of an example process 300 for establishing a connection with the mobile device 102, receiving identifiers of the mobile device 102, and receiving audio data at the EDR 108. At 302, the process 300 may begin with the first wireless headphone 100(1) powering on or receiving a request to pair (configure) with the mobile device 102. For instance, a user may press a power button at the first wireless headphone 100(1). Alternatively, the first wireless headphone 100(1) may receive, from the mobile device 102, a request (e.g., indication) to pair with the mobile device 102. Upon powering on, the first wireless headphone 100(1) may connect with other wireless headphones (e.g., the second wireless headphone 100(2)).

In the process of establishing the connection with the mobile device 102, at signal S304, the first wireless headphone 100(1) may transmit a signal to the mobile device 102. In some instances, the signal S304 may be a request for one or more device identifier(s) of the mobile device 102 and/or other data utilized to establish a connection between the first wireless headphone 100(1) and mobile device 102. Therein, at signal S306, the mobile device 102 may transmit a signal to the first wireless headphone 100(1). In some instances, the signal S306 may include the one or more device identifier(s) requested by the first wireless headphone 100(1). For instance, the one or more device identifier(s) may include, or represent, a make, a model, chipset, or other identifying characteristics of the mobile device 102. In some instances, the process 300 may omit the signal S304 and/or the signal S306. Instead, in some instances, the mobile device 102 may be configured to automatically transmit the one or more device identifier(s) upon connecting with the first wireless headphone 100(1).

At 308, upon exchanging information, the first wireless headphone 100(1) may establish a connection with the mobile device 102. For instance, the first wireless headphone 100(1) may communicatively couple with mobile device 102 over the communication channel 104. Noted above, as part of establishing the connection, the first wireless headphone 100(1) may also receive the one or more device identifier(s). In some instances, the first wireless headphone 100(1) may transmit a confirmation to the mobile device 102 indicating the connection between the first wireless headphone 100(1) and the mobile device 102.

At 310, as a result of establishing a connection, the mobile device 102 may transmit the audio data to the first wireless headphone 100(1) at the EDR 108. Again, this communication may occur over the communication channel 104. For example, the mobile device 102 may transmit a signal S312 which includes the audio data to be output at the EDR 108. Therein, at 314, the first wireless headphone 100(1) may receive the audio data at the EDR 108. In some instances, the mobile device 102 may be configured to automatically transmit the audio data at the EDR 108 as a result of establishing the connection with the first wireless headphone 100(1).

Figure 4:
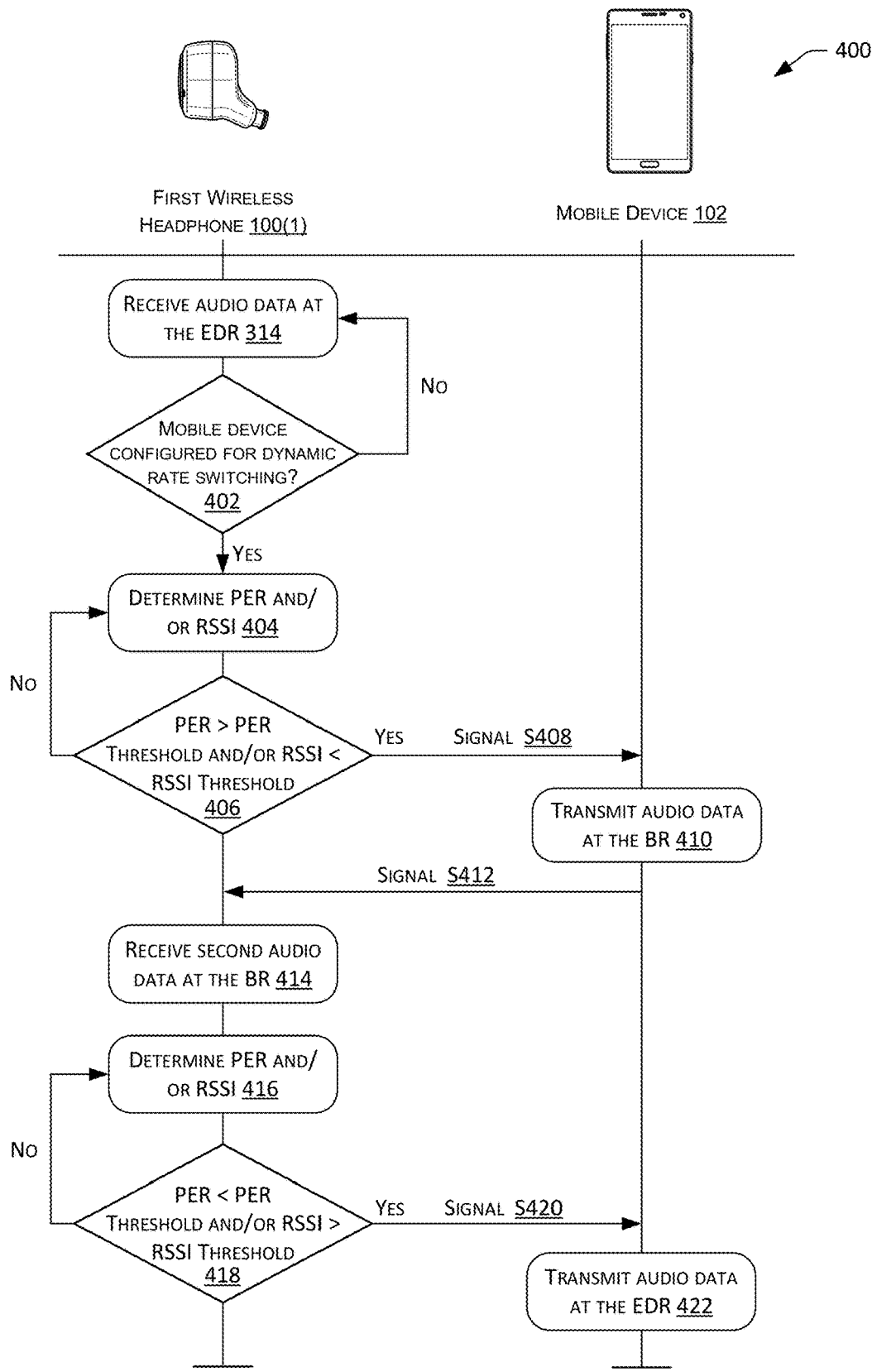
FIG. 4 illustrates an example signal diagram for dynamic rate switching between a mobile device and a wireless headphone.

FIG. 4 illustrates a signal diagram of an example process 400 for dynamically switching between transmitting audio data at the EDR 108 and the BR 106. In some instances, the process 400 may continue from 314 of FIG. 3 where the first wireless headphone 100(1) receives audio data at the EDR 108.

At 402, the first wireless headphone 100(1) may utilize the one or more device identifier(s) received from signal S306 to determine whether the mobile device 102 is configured for dynamic rate switching. Discussed in FIGS. 1 and 2, whether the mobile device 102 is configured for dynamic rate switching may include a capability of the mobile device 102 to dynamically switch between transmitting audio data at the EDR 108 and the BR 106 (or between a first data rate and a second data rate, where the first data rate and the second data rate are different). In some instances, determining whether the mobile device 102 is configured for dynamic rate switching may involve comparing the one or more device identifier(s) with a database or list of device identifier(s) (e.g., the list of dynamic rate switching device(s) 114). If the one comparison reveals the one or more device identifier(s) of the mobile device 102 is included within the list of device identifier(s), the first wireless headphone 100(1) may determine that the mobile device 102 is configured for dynamic rate switching. Comparatively, if the comparison reveals that the one or more device identifier(s) of the mobile device 102 is not included with the list of device identifier(s), the first wireless headphone 100(1) may determine that the mobile device 102 is not configured for dynamic rate switching.

Noted above, in some instances, the list of device identifier(s) may be stored locally at the first wireless headphone 100(1) or remote from the first wireless headphone 100(1), such as at the mobile device 102 and/or at the remote computing resource(s) 214. In such instances, the first wireless headphone 100(1) may transmit the one or more device identifier(s) to the mobile device 102 and/or at the remote computing resource(s) 214 and receive a corresponding indication whether the mobile device 102 is configured for dynamic rate switching.

At 402 in response to determining that the mobile device 102 is not configured for dynamic rate switching, the first wireless headphone 100(1) may continuously receive the audio data at the EDR 108 (as indicated by the loop to 314). That is, if the mobile device 102 is not configured for dynamic rate switching, the process 400 may end and the first wireless headphone 100(1) may only receive the audio data at the EDR 108.

Comparatively, at 402 and in response to determining that the mobile device 102 is configured for dynamic rate switching, the first wireless headphone 100(1) may proceed to 404.

At 404, the first wireless headphone 100(1) may determine a packet error rate (PER) value (e.g., the PER value 116) and/or a received signal strength indicator (RSSI) value (e.g., the RSSI value 118) corresponding to receiving audio data at the EDR. That is, in response to determining that the mobile device 102 is configured for dynamic rate switching, the first wireless headphone 100(1) may begin monitoring and/or determining the PER value 116 and/or the RSSI value 118. As discussed in detail herein, this determination may be utilized by the first wireless headphone 100(1) to request the audio data at varying rates. In some instances, the PER value 116 and/or the RSSI value 118 may represent an average PER value and an average RSSI value, respectively.

At 406, the first wireless headphone 100(1) may determine whether the PER value 116 is greater than a PER threshold and/or whether the RSSI value 118 is less than a RSSI threshold. For instance, the first wireless headphone 100(1) may compare the PER value 116 and/or the RSSI value 118 (e.g., 404) with the PER threshold and/or the RSSI threshold (e.g., the threshold(s) 200), respectively. Based at least in part on determining that the PER value 116 is not greater than the PER threshold and/or the RSSI value 118 is not less than the RSSI threshold, the first wireless headphone 100(1) may continue receiving the first audio data at the EDR 108, such that the process 400 may loop back to 404. Here, the process 400 may continue determining the PER value 116 and/or the RSSI value 118 for the purpose of determining whether the PER value 116 is greater than the PER threshold and/or the RSSI value 118 is less than the RSSI threshold.

At signal S408, based at least in part on determining that the PER value 116 is greater than the PER threshold and/or the RSSI value 118 is less than the RSSI threshold, the first wireless headphone 100(1) may transmit a signal (e.g., indication, control packet, etc.) to the mobile device 102. The signal S408 may represent an indication or request for the mobile device 102 to transmit audio data at the BR 106 and/or may cause the mobile device 102 to transmit audio data at the BR 106. Hence, when the PER value 116 is greater than the PER threshold and/or the RSSI value 118 is less than the RSSI threshold, the mobile device 102 may not be able to support transmitting the audio data at the EDR 108. Here, rather than canceling or terminating the communication channel 104, or the audio data being buffered at the first wireless headphone 100(1), the mobile device 102 may alternatively support transmitting audio data at the BR 106. Moreover, mobile device 102, may in some instances, transmit an acknowledgment back to the first wireless headphone 100(1) indicating a receipt of the indication. Additionally, in some instances, after switching to the BR 106, the process 400 may wait for a threshold amount of time before determining to switch back to the EDR 108 or switching back to the EDR 108.

At 410, the mobile device 102 may transmit audio data to the first wireless headphone 100(1) at the BR 106. For instance, the mobile device 102 may transmit a signal S412, which may include audio data, to the first wireless headphone 100(1). The audio data transmitted at 410 (or included in the signal S412) may include a portion of the audio data not transmitted by the mobile device 102 at the EDR 108. That is, because the mobile device 102 may switch from the EDR 108 to the BR 106, in some instances, not all of the audio data associated with a song, for instance, may be transmitted at the EDR 108. Accordingly, the portion of the audio signal transmitted at the BR 106 (e.g., 410) may represent a remaining portion of the audio data associated with the song that was not transmitted to the first wireless headphone 100(1) at the EDR 108.

At 414, the first wireless headphone 100(1) may receive audio data at the BR 106 from the mobile device 102. At 416, the first wireless headphone 100(1) may determine a packet error rate (PER) value (e.g., the PER value 116) and/or a received signal strength indicator (RSSI) value (e.g., the RSSI value 118) corresponding to receiving audio data at the BR 106. In some instances, the PER value 116 and/or the RSSI value 118 may represent an average PER value and an average RSSI value, respectively.

At 418, the first wireless headphone 100(1) may determine whether the PER value 116 is less than a PER threshold and/or whether the RSSI value 118 is greater than a RSSI threshold. For instance, the first wireless headphone 100(1) may compare the PER value 116 and/or the RSSI value 118 (e.g., 418) with the PER threshold and/or the RSSI threshold (e.g., the threshold(s) 200), respectively. Based at least in part on determining that the PER value 116 is greater than the PER threshold and/or the RSSI value 118 is less than the RSSI threshold, the first wireless headphone 100(1) may continue receiving audio data at the BR 106, such that the process 400 may loop back to 416. Here, the process 400 may continue determining the PER value 116 and/or the RSSI value 118 for the purpose of determining whether the PER value 116 is less than the PER threshold and/or the RSSI value 118 is greater than the RSSI threshold.

At signal S420, based at least in part on determining that the PER value 116 is less than the PER threshold and/or the RSSI value 118 is greater than the RSSI threshold, the first wireless headphone 100(1) may transmit a signal (e.g., indication, control packet, etc.) to the mobile device 102. The signal S420 may represent an indication or request for the mobile device 102 to transmit audio data at the EDR 108 and/or may cause the mobile device 102 to transmit audio data at the EDR 108. Moreover, mobile device 102, may in some instances, transmit an acknowledgment back to the first wireless headphone 100(1) indicating a receipt of the indication. Additionally, in some instances, after switching to the EDR 108, the process 400 may wait for a threshold amount of time before determining whether to switch back to the BR 106. Hence, when the PER value 116 is less than the PER threshold and/or the RSSI value 118 is greater than the RSSI threshold, the mobile device 102 may be able support transmitting the audio data at the EDR 108. At 422, the mobile device 102 may transmit the audio data to the first wireless headphone 100(1) at the EDR 108.

Figure 5:
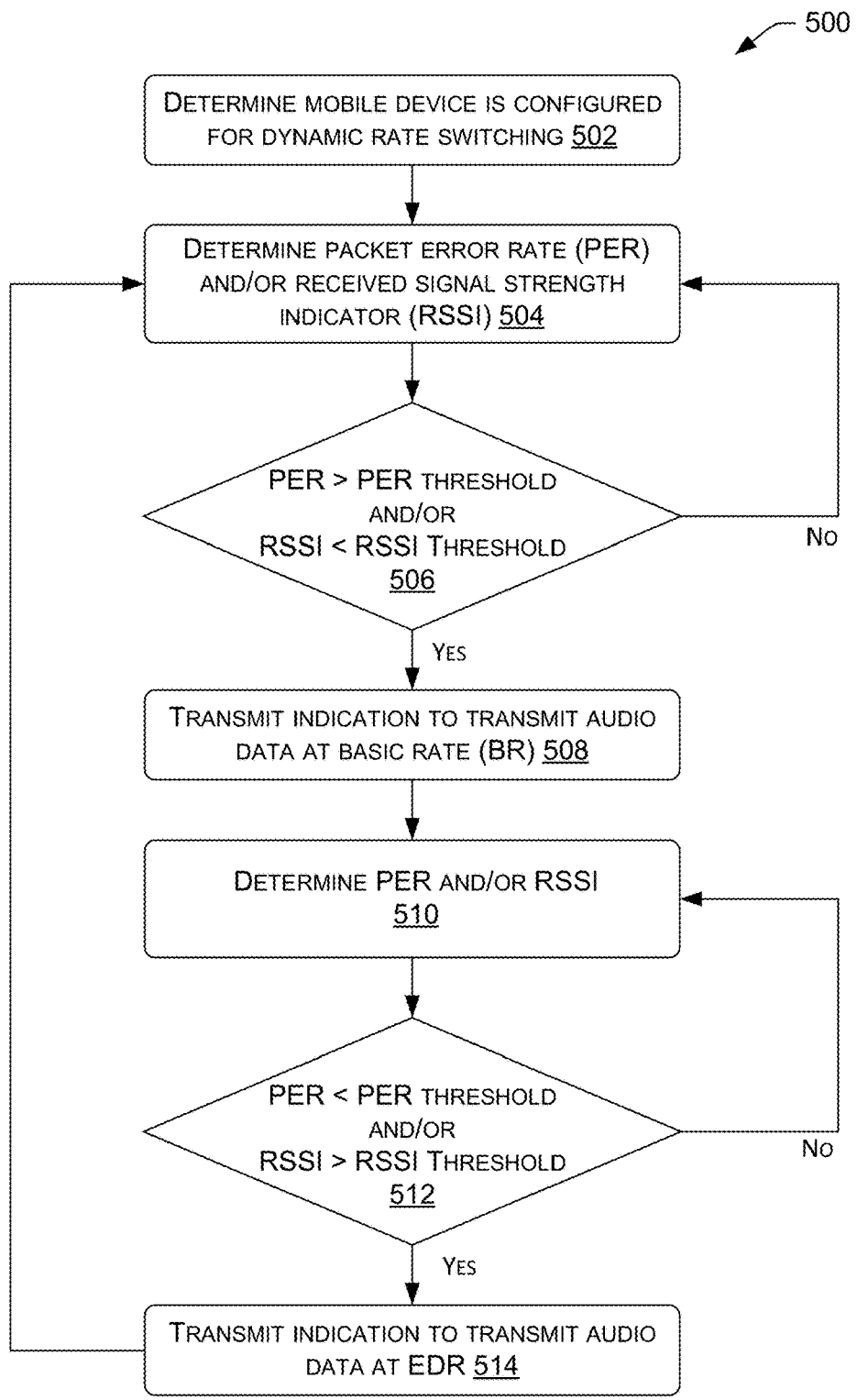
FIGS. 5 and 6 illustrate respective flow diagrams of example processes relating to dynamic rate switching.

FIG. 5 illustrates an example process 500 of dynamic rate switching. At 502, the process 500 may determine that the mobile device 102 is configured for dynamic rate switching. For instance, the first wireless headphone 100(1) may determine, using the device identifier(s) of the mobile device 102, that the mobile device 102 is configured for dynamic rate switching.

At 504, the process 500 may determine a packet error rate (PER) and/or a received signal strength indicator (RSSI) associated with receiving audio data at the EDR. For instance, the first wireless headphone 100(1) may determine the PER value 116 and/or the RSSI value 118 associated with audio data received at the EDR 108.

At 506, the process 500 may determine whether the PER value is greater than a PER threshold and/or whether the RSSI value is less than a RSSI threshold. For instance, the first wireless headphone 100(1) may compare the PER value 116 and RSSI value 118, from 504, to determine whether the PER value 116 is greater than the PER threshold and/or whether the RSSI value 118 is less than the RSSI threshold, respectively.

Following a "No" from 506, if the first wireless headphone 100(1) determines that the PER value 116 is not greater than the PER threshold and/or the RSSI value 118 is not less than the RSSI threshold, the first wireless headphone 100(1) may continue to receive audio data at the EDR 108, such that the process 500 may loop back to 504. Therein, the process 500 may continue determining the PER value 116 and/or the RSSI value 118 for the purpose of determining whether the PER value 116 is greater than the PER threshold and/or the RSSI value 118 is less than the RSSI threshold.

Following a "Yes" from 506, if the first wireless headphone 100(1) determines that the PER value 116 is greater than the PER threshold and/or the RSSI value 118 is less than the RSSI threshold, then the process 500 may continue to 508 and transmit and indication to transmit audio data at the BR 106. For instance, the first wireless headphone 100(1) may transmit an indication to the mobile device 102 indicating that the mobile device 102 is to transmit the audio data at the BR 106.

At 510, the process 500 may determine a PER value 116 and/or a RSSI value 118 associated with receiving audio data at the BR. For instance, the first wireless headphone 100(1) may determine the PER value 116 and/or the RSSI value 118 associated with the audio data received at the BR 106. In some instances, the PER value 116 and/or the RSSI value 118 may reset as a result of switching between the EDR 108 and the BR 106. In some instances, the PER value 116 and/or the RSSI value 118 may represent an average PER value and an average RSSI value, respectively.

At 512, the process 500 may determine whether the PER value is less than a PER threshold and/or whether the RSSI value is greater than a RSSI threshold. For instance, the first wireless headphone 100(1) may compare the PER value 116 and RSSI value 118, from 510, to determine whether the PER value is greater than the PER threshold and/or whether the RSSI value is less than the RSSI threshold.

Following a "No" from 512, if the first wireless headphone 100(1) determines that the PER value 116 is not less than the PER threshold and/or the RSSI value 118 is less than the RSSI threshold, then the process 500 may loop back to 510. Therein, the process 500 may continue determining the PER value 116 and/or the RSSI value 118 associated with receiving audio data at the BR 106 for the purpose of determining whether the PER value 116 is less than the PER threshold and/or the RSSI value 118 is greater than the RSSI threshold.

Following a "Yes" from 512, if the first wireless headphone 100(1) determines that the PER value less than the PER threshold and/or the RSSI value is greater than the RSSI threshold, the first wireless headphone 100(1) may proceed to 514.

At 514, the process 500 may transmit and indication to transmit audio data at the EDR 108. For instance, the first wireless headphone 100(1) may transmit an indication to the mobile device 102 indicating that the mobile device 102 is to transmit the audio data at the EDR 108. From 514, the process 500 may loop back to 504, so as to begin receiving the audio data at the EDR 108 and determine the PER and/or RSSI associated with receiving the audio data at the EDR 108.

Figure 6:
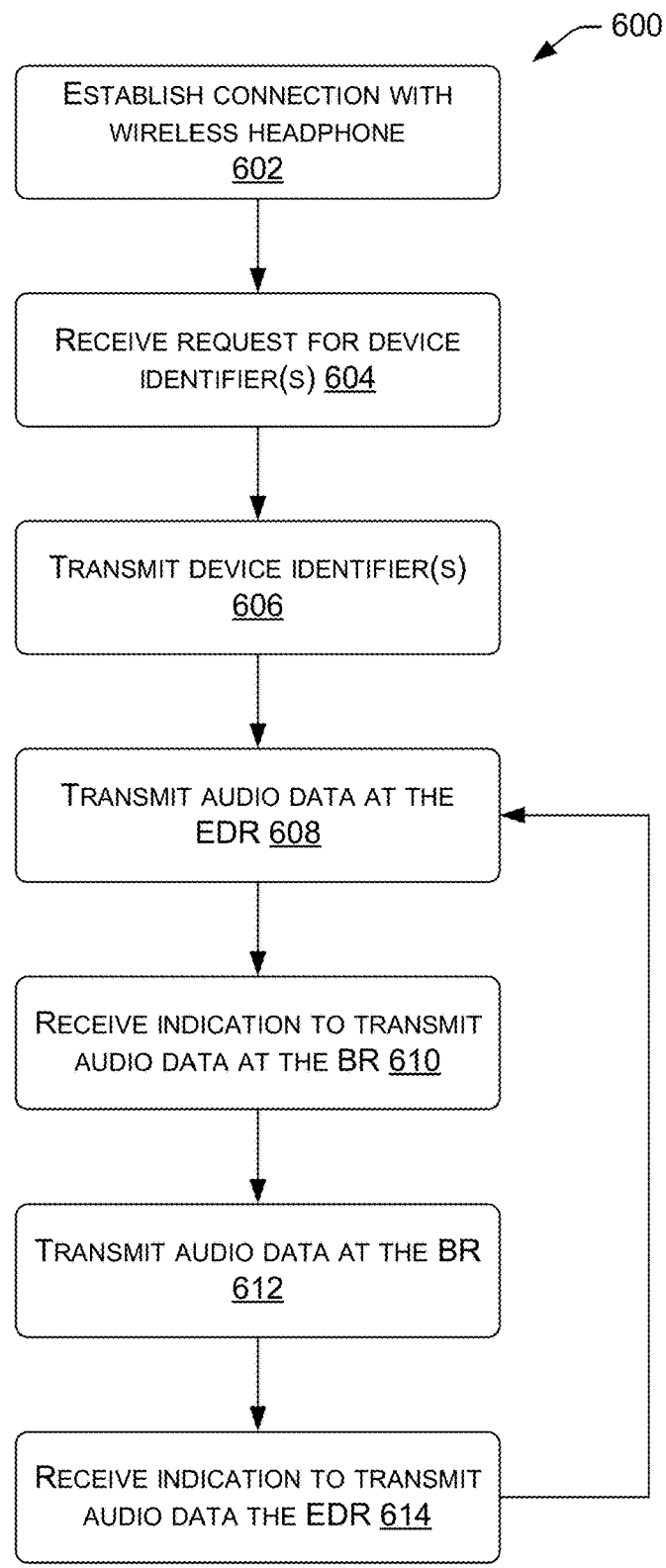

FIG. 6 illustrates an example process 600 of dynamically transmitting audio data between an enhanced data rate (EDR) and a basic rate (BR). In some instances, the process 600 may be implemented by an electronic device, such as the mobile device 102.

At 602, the process 600 may establish a connection with a wireless headphone. For instance, the mobile device 102 may establish a connection with the wireless headphone 100(1).

At 604, the process 600 may receive a request for device identifier(s). For instance, the mobile device 102 may receive, from the first wireless headphone 100(1), a request for one or more device identifier(s) of the mobile device 102.

At 606, the process 600 may transmit one or more device identifier(s). For instance, the mobile device 102 may transmit the one or more device identifier(s) to the first wireless headphone 100(1).

At 608, the process 600 may transmit audio data at the EDR. For instance, the mobile device 102 may transmit audio data to the first wireless headphone 100(1) at the EDR 108.

At 610, the process 600 may receive an indication to transmit audio data at the BR. For instance, the mobile device 102 may receive, from the first wireless headphone 100(1), an indication to transmit audio data at the BR 106.

At 612, the process 600 may transmit audio data at the BR. For instance, the mobile device 102 may transmit audio data to the first wireless headphone 100(1) at the BR 106.

At 614, the process 600 may receive an indication to transmit audio at the EDR. For instance, the mobile device 102 may receive, from the first wireless headphone 100(1), an indication to transmit audio data at the EDR 108. From 614, the process 610 may loop may back to 608, where the mobile device may transmit audio data at the EDR 108. As noted above, the audio data transmitted at 608 may represent a first portion of the audio data, while the audio data transmitted at 612 may represent a second portion of the audio data. Here, the second portion of the audio data may correspond to a remaining portion of the audio data not transmitted at 608. For instance, if audio data associated with a song is transmitted at the EDR 108, and thereafter, the mobile device 102 switches to transmitting audio data at the BR 106, a first portion of the song may represent audio transmitted at the EDR 108 while a second portion of the song may represent audio transmitted at the BR 106.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An audio system comprising:
a first wireless headphone; and
a second wireless headphone;
wherein the first wireless headphone comprises:
one or more first processors; and
one or more first non-transitory computer-readable media storing computer-executable instructions that, when executed by the one or more first processors, cause the one or more first processors to perform acts comprising:
receiving a first portion of audio data from a mobile device at an enhanced data rate (EDR);
receiving, from the mobile device, a device identifier of the mobile device;
comparing the device identifier to a list of device identifiers associated with respective devices configured for dynamic rate switching between a basic rate (BR) and the EDR that is greater than the BR;
determining, based at least in part on the comparing, that the mobile device is configured for dynamic rate switching;
transmitting the first portion of audio data to the second wireless headphone;
determining, over a first period of time, a first average packet error rate (PER) value associated with receiving the first portion of audio data at the EDR;
determining, over the first period of time, a first average received signal strength indicator (RSSI) value associated with receiving the first portion of audio data at the EDR;
determining that the first average PER value is greater than a first PER threshold, the first PER threshold corresponding to a PER value at which output of audio data at the audio system may buffer;
determining that the first average RSSI value is less than a first RSSI threshold, the first RSSI threshold corresponding to a RSSI value at which output of audio data at the audio system may buffer;
requesting the mobile device to transmit audio data at the BR;
receiving a second portion of audio data from the mobile device at the BR; and
transmitting the second portion of audio data to the second wireless headphone.

2. The audio system as recited in claim 1, wherein:
the one or more first non-transitory computer-readable media store computer-executable instructions that, when executed by the one or more first processors, cause the one or more first processors to further perform acts comprising:
determining, over a second period of time that is different than the first period of time, a second average PER value associated with receiving the second portion of audio data at the BR;
determining, over the second period of time, a second average RSSI value associated with receiving the second portion of audio data at the BR;
determining at least one of:
that the second average PER value is greater than a second average PER threshold, wherein the second average PER threshold is greater than the first average PER threshold; or
that the second average RSSI value is less than a second average RSSI threshold, wherein the second average RSSI threshold is greater than the first average RSSI threshold;
requesting the mobile device to transmit audio data at the EDR;
receiving a third portion of audio data from the mobile device at the EDR; and
transmitting the third portion of audio data to the second wireless headphone.

3. A method comprising:
receiving, at a wireless headphone, first audio data at a first data rate from an electronic device communicatively coupled to the wireless headphone;
receiving, at the wireless headphone, a device identifier of the electronic device;
determining, based at least in part on the device identifier, that the electronic device supports switching between the first data rate and a second data rate that is less than the first data rate;
determining, at the wireless headphone, a first average packet error rate (PER) value associated with receiving the first audio data;
determining, at the wireless headphone, a first average received signal strength indicator (RSSI) value associated with receiving the first audio data;
determining, at the wireless headphone, at least one of:
the first average PER value is greater than a first average PER threshold; or
the first average RSSI value is less than a first average RSSI threshold;
requesting, by the wireless headphone, the electronic device to transmit second audio data at the second data rate; and
receiving, at the wireless headphone, the second audio data at the second data rate from the electronic device.

4. The method as recited in claim 3, further comprising:
determining, at the wireless headphone, a second average PER value associated with receiving the second audio data;
determining, at the wireless headphone, a second average RSSI value associated with receiving the second audio data;
determining, at the wireless headphone, at least one of:
the second average PER value is less than a second average PER threshold; or
the second average RSSI value is greater than a second average RSSI threshold; and
requesting, by the wireless headphone, the electronic device to transmit third audio data at the first data rate.

5. The method as recited in claim 4, wherein:
the first average PER value is determined over a first period of time;
the first average RSSI value is determined over the first period of time;
the second average PER value is determined over a second period of time that is different than the first period of time; and
the second average RSSI value is determined over the second period of time.

6. The method as recited in claim 4, wherein at least one of:
   the first average PER threshold is associated with a PER that is greater than the second average PER threshold; or
   the first average RSSI threshold is associated with a RSSI that is less than the second average RSSI threshold.

7. The method as recited in claim 3, wherein the requesting the electronic device to transmit the second audio data at the second data rate is based at least in part on determining that the first average PER value is greater than the first average PER threshold and the first average RSSI value is greater than the first average RSSI threshold.

8. The method as recited in claim 3, wherein:
   the first data rate comprises a Bluetooth enhanced data rate; and
   the second data rate comprises a Bluetooth basic rate.

9. The method as recited in claim 3, wherein at least one of:
   the first data rate is based at least in part on the electronic device; or
   the second data rate is based at least in part on the electronic device.

10. The method as recited in claim 3, wherein the first average PER threshold represents a rate at which packets sent from the electronic device are not successfully received at the wireless headphone.

11. The method as recited in claim 3, further comprising requesting, by the wireless headphone, the device identifier of the electronic device.

12. The method as recited in claim 3, further comprising:
   determining, at the wireless headphone and over a first period of time, a second average PER value associated with receiving the second audio data;
   determining, at the wireless headphone and over the first period of time, a second average RSSI value associated with receiving the second audio data;
   determining, at the wireless headphone, at least one of:
      the second average PER value is greater than a second average PER threshold; or
      the second average RSSI value is less than a second average RSSI threshold;
   determining, at the wireless headphone and over a second period of time that at least partially overlaps with the first period of time, a third average PER value associated with receiving the second audio data;
   determining, at the wireless headphone and over the second period of time, a third average RSSI value associated with receiving the second audio data;
   determining, at the wireless headphone, at least one of:
      the third average PER value is less than the second average PER threshold; or
      the third average RSSI value is greater than the second average RSSI threshold; and
   requesting, by the wireless headphone, the electronic device to transmit third audio data at the first data rate.

13. A wireless headphone, comprising:
   one or more processors; and
   one or more computer-readable media storing computer-executable instructions that, when executed by the one or more processors, cause the one or more processors to perform acts comprising:
      receiving first data at a first data rate from an electronic device communicatively coupled to the wireless headphone;
      determining a device identifier of the electronic device;
      determining, based at least in part on the device identifier, that the electronic device supports dynamic rate switching between the first data rate and a second data rate;
      determining a packet error rate (PER) value associated with receiving the first data; and
      requesting, based at least in part on the PER value being greater than a PER threshold, the electronic device to transmit second data at the second data rate.

14. The wireless headphone as recited in claim 13, wherein:
   the one or more computer-readable media store computer-executable instructions that, when executed by the one or more processors, cause the one or more processors to further perform an act comprising determining a received signal strength indicator (RSSI) value associated with receiving the second data; and
   requesting the electronic device to transmit the second data at the second data rate is based at least in part on the RSSI value being less than a RSSI threshold.

15. The wireless headphone as recited in claim 14, wherein the PER threshold comprises a first PER threshold, the RSSI threshold comprises a first RSSI threshold, and wherein the one or more computer-readable media store computer-executable instructions that, when executed by the one or more processors, cause the one or more processors to further perform acts comprising:
   receiving the second data from the electronic device at the second data rate;
   determining that at least one of:
      a PER value associated with receiving the second data; or
      a RSSI value associated with receiving the second data;
   determining that at least one of:
      the PER value associated with receiving the second data is less than a second PER threshold; or
      the RSSI value associated with receiving the second data is greater than a second RSSI threshold; and
   requesting the electronic device to transmit third data at the first data rate.

16. The wireless headphone as recited in claim 15, wherein at least one of:
   the PER value associated with receiving the first data comprises a first average PER value over a first period of time;
   the RSSI value associated with receiving the first data comprises a first average RSSI value over the first period of time;
   the PER value associated with receiving the second data comprises a second average PER value over a second period of time that is different than the first period of time; or
   the RSSI value associated with receiving the second data comprises a second average RSSI value over the second period of time.

17. The wireless headphone as recited in claim 13, wherein:
   the PER value associated with receiving the first data comprises an average PER value calculated over a first period of time; and
   the one or more computer-readable media store computer-executable instructions that, when executed by the one or more processors, cause the one or more processors to further perform an act comprising based at least in part on requesting the electronic device to transmit the second data at the second data rate, recalculating a new average PER value over a second period of time that is different than the first period of time.

18. The wireless headphone as recited in claim 13, wherein at least one of:
   the first data rate is based at least in part on the electronic device; or
   the second data rate is based at least in part on the electronic device.

19. The wireless headphone as recited in claim 13, wherein the first data rate is greater than the second data rate.

20. The wireless headphone as recited in claim 13, wherein the one or more computer-readable media store computer-executable instructions that, when executed by the one or more processors, cause the one or more processors to further perform acts comprising:
   receiving the second data at the second data rate;
   determining that a threshold amount of time has elapsed since receiving the second data at the second data rate; and
   requesting, based at least in part on the threshold amount of time elapsing, the electronic device to transmit third data at the first data rate.

* * * * *